Aug. 16, 1932.  G. C. KARSHNER  1,871,529
AUTOMATIC FERTILIZER
Filed Feb. 6, 1932  2 Sheets-Sheet 1

INVENTOR
George C. Karshner
BY
ATTORNEYS

Aug. 16, 1932.  G. C. KARSHNER  1,871,529
AUTOMATIC FERTILIZER
Filed Feb. 6, 1932    2 Sheets-Sheet 2
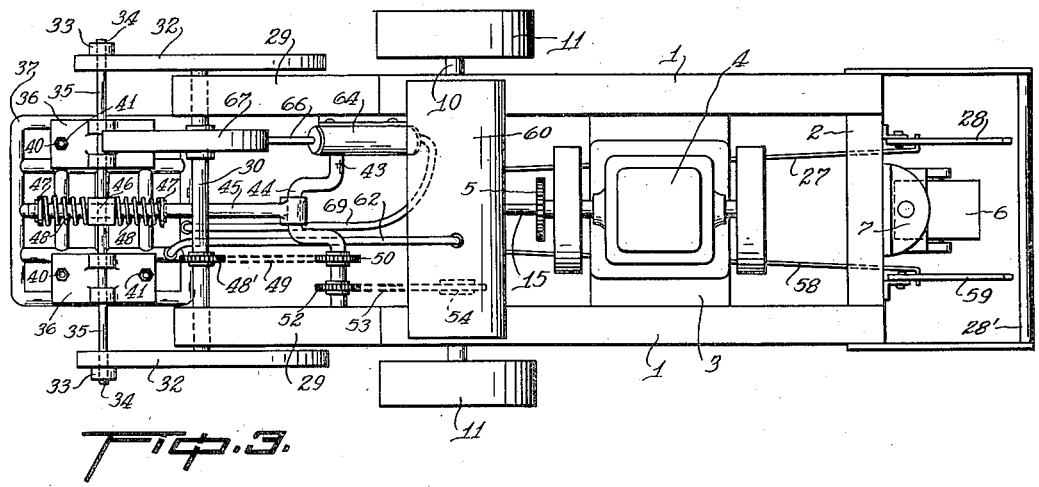
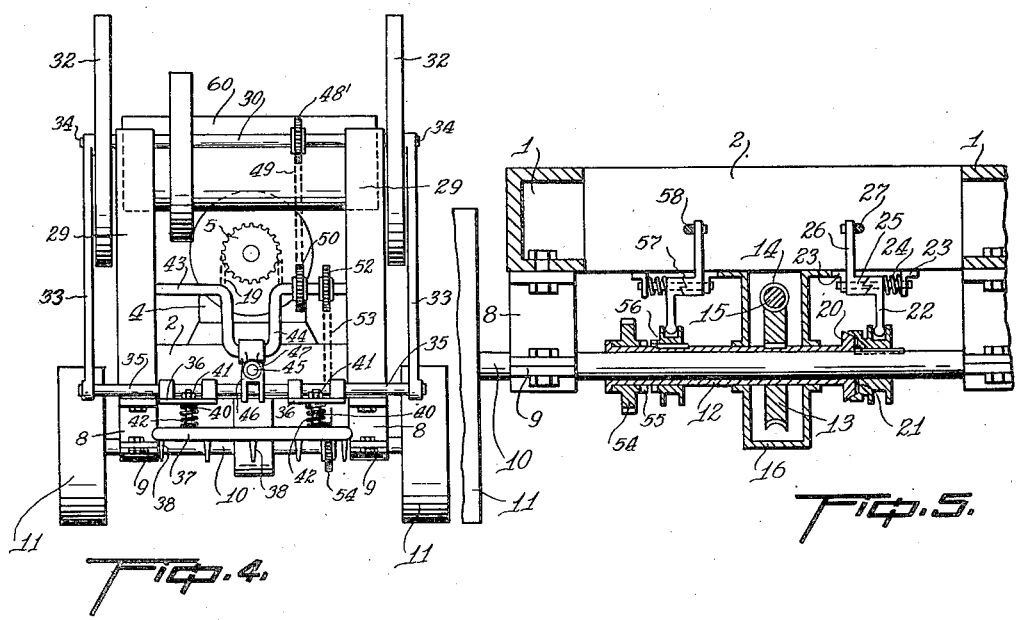
INVENTOR
George C. Karshner
BY
ATTORNEYS Patented Aug. 16, 1932

1,871,529

UNITED STATES PATENT OFFICE

GEORGE C. KARSHNER, OF DETROIT, MICHIGAN

AUTOMATIC FERTILIZER

Application filed February 6, 1932. Serial No. 591,381.

The present invention relates to a novel fertilizing machine of a type particularly adapted for fertilizing soil in which grass or other plants are growing.

The primary object of the present invention is to provide a machine which is particularly adapted for stimulating growth of grass upon lawns, golf courses and the like by injecting nourishment beneath the surface of the soil in which the grass is growing so that it may be readily absorbed by the roots thereof. In cases where sufficient nourishment is not found in the soil to support the growth of grass it has been the practice to scatter a fertilizing material on top of the grass and if a large quantity of fertilizing material is applied in this manner the heat generated thereby as it lies in a mass on top of the grass is sufficient to burn the leaves of the grass and off-set the beneficial effects of the fertilizer that penetrates through the soil to the roots. In cases where only a small amount of fertilizer is applied on top of the grass only a small amount of the same penetrates through the soil to a point where it may be absorbed by the roots and it is apparent therefore that the only method of attaining quick results is by injecting the material directly into the soil so that it may be readily absorbed by the roots of the grass.

Another object of the present invention is to provide a mechanism for supporting a manifold equipped with a series of discharge nozzles, means for supplying a liquid form of fertilizer to said manifold and alternately subjecting the liquid in the manifold to pressure greater than atmospheric and pressure less than atmospheric. The supporting mechanism alternately raises and lowers the manifold so that the nozzles are injected into the soil at the time of greater than atmospheric pressure so that liquid is expelled from said nozzles into the soil and at the time of less than atmospheric pressure the manifold is raised from the soil and carried forward by the device.

The supporting means for the manifold is characterized by elements that permit the manifold to remain stationary while the remainder of the machine moves forward and which causes the upward and downward movement of the manifold to be in a true vertical line so that nozzles do not in any way tear the surface of the soil as they are forced into or withdrawn from the same.

With the above and other ends in view the invention consists in matters hereinafter set forth and more particularly pointed out in the appended claims, reference being had to the accompanying drawings in which Fig. 1 is a side elevation of a fertilizing machine embodying the present invention;

Fig. 3 is a top plan view;

Fig. 4 is a front elevation;

Fig. 5 is a cross sectional view of the front axle, illustrating the clutch mechanism for driving the machine.

Like characters of reference are employed throughout to designate corresponding parts.

Figure 1:
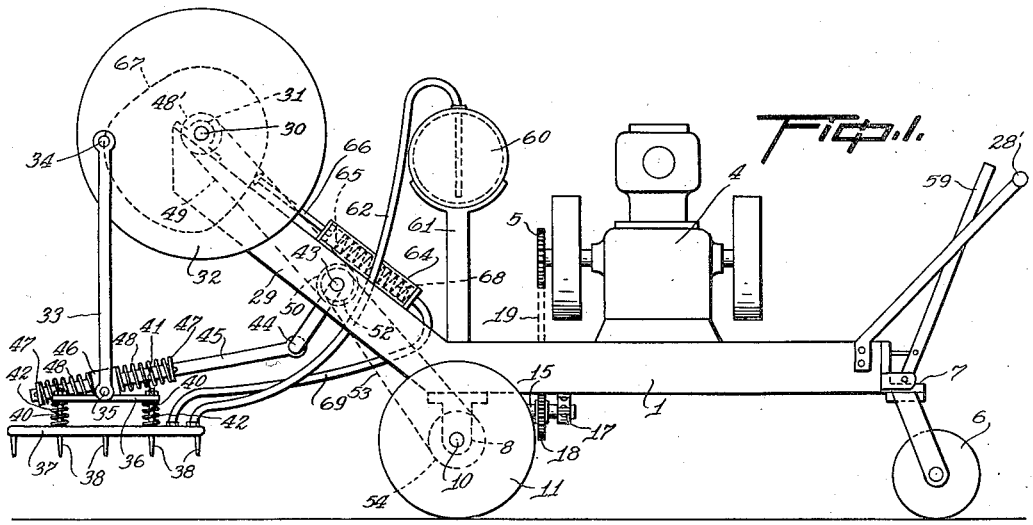
Figure 2:
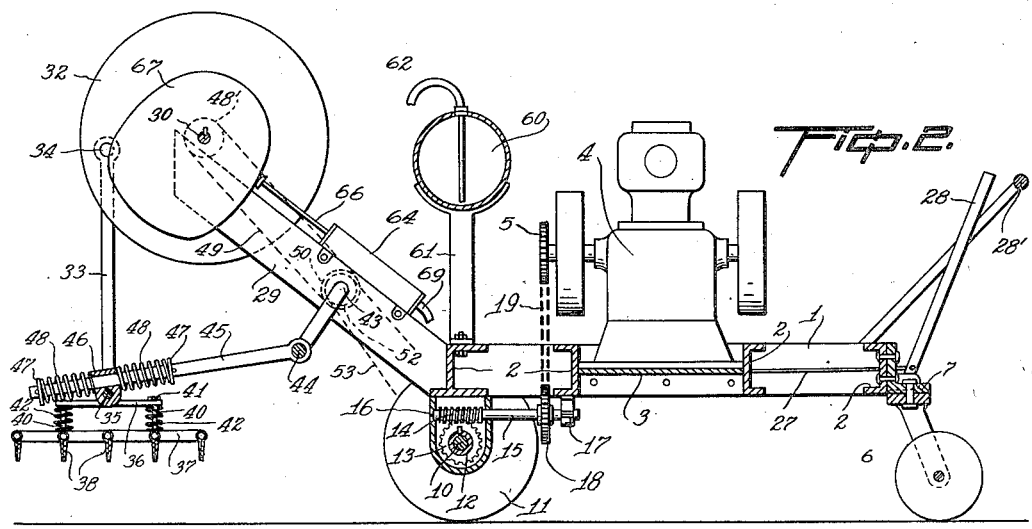
Fig. 2 is a vertical cross sectional view.

The numeral 1 indicates side frame members that are joined together by cross frame members 2. A plate 3 is secured between the center cross members 2 to provide a support for an internal combustion motor 4 which may be of any suitable type having a sprocket wheel 5. At the rear end of the frame is mounted a castor wheel 6 by means of a bracket 7 and at the forward ends of the frame members 1 are mounted brackets 8 equipped with bearings 9 that support an axle 10 upon the outer ends of which are keyed or rigidly bolted wheels 11.

On the axle 10 is mounted a sleeve 12 in a manner whereby it may freely rotate thereon. Keyed on the sleeve 12 is a worm gear 13 which meshes with a worm 14 on the forward end of a shaft 15 that is supported at its forward end in a casing 16 and at its rear end in the bracket bearing 17. Adjacent the rear end of the shaft 15 is keyed a sprocket 18 that is connected to the sprocket 5 by a chain 19 and it becomes apparent that the sleeve 12 is rotated on the axle 10 at all times when the motor 4 is running.

On one end of the sleeve is formed a male cone clutch member 20 that is engaged by a female clutch member 21 that is keyed to slide on the axle. In this manner a driving connection is established between the motor 4 and the axle 10 when the two clutch member 20 and 21 are in contact with each other. To move the clutch member 21 into contact with the member 20 there is provided a clutch actuating arm 22 that is slidably supported between brackets 23 and adapted to be moved by pressure of a spring 24 to a position where it moves the clutch member 21 into contact with the member 20. To retract the clutch member 21 and break the driving connection between the motor and the axle there is provided a ratchet faced member 25 that engages a ratchet face on the clutch actuating arm 22 so that rotation of the member 25 moves the arm 22 in a manner to slide the clutch member 21 out of engagement with the member 20. To rotate the member 25 there is provided an arm 26 that is connected by a rod or link 27 to a pivotally mounted lever 28 mounted at the rear of the device.

The above described drive establishing means is illustrated and described as formed of well known parts obtainable upon the market and it is to be understood that it forms no further part in connection with the present invention than as an indication that means should preferably be provided for propelling the device and for controlling the same. To steer the device when it is in motion there is provided a handle bar 28' for manually swinging the frame around on the castor wheel 6.

A pair of projecting arms 29 are formed on the front ends of the side frame members 1 to project outwardly in front of the axle 10 and upwardly at an angle relative to a horizontal plane. A shaft 30 is secured on the outermost ends of the members 29 by means of brackets 31 with its ends projecting outwardly on each side of the members 29. On the outer ends of the shaft 30 are secured wheels 32 to which connecting links 33 are pivotally attached as at 34 to hang downwardly therefrom. The lower ends of the links 33 are joined by the shaft 35 upon which are pivotally mounted a pair of plates 36.

A manifold 37 is preferably formed of tubing in a manner to support a plurality of pointed nozzles 38 having passages 39 of a small diameter. Projecting upwardly from the manifold are a plurality of bolts 40 that pass freely through openings in the plates 36. Nuts 41 are placed on the bolts on top of the plates in a manner to prevent withdrawal of the bolts from the plates and to permit the bolts to slide relative to the plates. Coiled springs 42 are sleeved on the bolts between the plates and the manifold and through this mounting it becomes possible for the manifold 37 to be moved closer to the plates 36 by any external pressure on the manifold sufficient to compress the coiled springs 42.

Rotatably mounted in the extension members 29 is a shaft 43 which is formed with a crank 44 upon which is mounted a connecting rod 45 that extends through a bearing block 46 that is carried by the shaft 35. Washers 47 are secured on the connecting rod 45 in spaced relation to the block 46 and coiled springs 48 are sleeved on the connecting rod and interposed between the block 46 and the washers 47. It is apparent that the connecting rod 45 may slide in either direction in the block 46 as a result of any external force sufficient to compress either of the coiled springs 47.

A sprocket 48' is keyed on the shaft 30 and is connected by a chain 49 to a sprocket 50 on the shaft 43 so that any rotation of one of said shafts must be accompanied by rotation of the other. A second sprocket 52 is connected by a chain 53 to a sprocket 54 that is loosely mounted on the sleeve 12 which is, as above described, constantly driven by the motor 4. One of the faces of the sprocket is provided with a clutch face 55 which is adapted to be engaged by the clutch member 56 which is slidably keyed on the sleeve. To move the clutch member 56 into engagement with the sprocket 54 so that the shafts 43 and 30 may be rotated there is provided a clutch actuating member 57 that is operated through a connecting link 58 by a lever 59 that is pivotally mounted at the rear of the device.

A tank 60 is supported by vertical members 61 at a point above the manifold 37 to which it is connected by a flexible hose 62. A check valve 63 is provided to prevent flow in a backward direction through the hose, the check valve being illustrated as the conventional type of check valve that suits requirements and that any other known type of check valve may be employed.

A pump cylinder 64 is rigidly mounted on one of the members 29 and slidably receives a piston 65 having a piston rod 66 that is engaged by a cam 67 that is mounted on the shaft 30. Rotation of the cam alternately forces the piston inwardly and then releases it so that a coiled spring 68 may force it outwardly again. A flexible hose 69 connects the cylinder 64 to the manifold 37.

In operation the tank 60 is filled with a fertilizing material in liquid form. The device is propelled along the ground by the motor 4 in the manner above described and the clutch member 56 is moved into engagement with the sprocket 54 so that the shafts 43 and 30 are rotated. As the shaft 30 rotates the wheels alternately raise and lower the manifold 37 and when the manifold is forced downwardly the nozzles 38 are forced into the soil. The connecting rod 45 and the crank 44 are also in movement at the same time and cause the manifold to be moved in a vertical line without unnecessary swaying.

For an example it will be assumed that the length of stroke of the links 33 caused by rotation of the members 32 is eight inches. In this case the rotation of the members 32 is timed in relation to the rotation of the wheels 11 so that the members 32 make half a revolution while the wheels 11 travel eight inches on the ground and therefore when the members 32 and wheels 11 are rotated in the same direction the members 32 move the links and manifold backward a distance of eight inches while at the lower extremity of the stroke while at the same time the wheels 11 carry the frame forward eight inches. This combined movement permits the nozzles 39 to be forced into the soil in a vertical line, to remain perfectly stationary therein while the remainder of the vehicle moves forward, and to be removed from the soil by movement in a true vertical line. In this manner tearing of the sod is entirely avoided.

Figure 6:
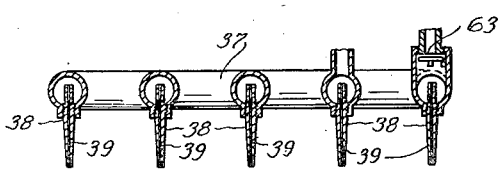
Fig. 6 is a cross sectional view of the fertilizer manifold.

The stroke of the piston 65 in the pump cylinder 64 is so governed by the cam 67 that the pressure stroke is only at the time the nozzles are imbedded in the ground. The suction stroke caused by the spring 68 is continuous at all other times and by constructing the pump with a capacity greater than that required for the actual injection of the fertilizer from the nozzles it becomes possible for the suction stroke to draw up the liquid flowing from the tank and part of the liquid from the manifold. The nozzles are mounted in the manifold so that their inner opening is adjacent the top of the manifold as illustrated in Fig. 6 and this feature avoids likelihood of the liquid dripping through the nozzles at the time of the suction stroke of the piston 65.

Although a specific embodiment of the present invention has been illustrated and described it is to be understood that various changes may be made within the scope of the appended claims without departing from the spirit of the invention, and such changes are contemplated.

What I claim is:—

1. A fertilizing machine comprising a wheeled frame, a motor adapted to drive said frame, rotatable members carried by said frame and adapted to be rotated by said motor, and a manifold equipped with a plurality of nozzles suspended from said rotatable members and adapted to be raised and lowered thereby.

2. A fertilizing machine comprising a wheeled frame, a motor adapted to drive said frame, rotatable members carried by said frame and adapted to be rotated by said motor, a manifold equipped with a plurality of nozzles suspended from said rotatable members and adapted to be raised and lowered thereby, a crank rotatably supported remote from said rotatable members, and a connecting rod on said crank resiliently connected to said manifold.

3. A fertilizing machine comprising a wheeled frame, a motor adapted to drive said frame, rotatable members carried by said frame and adapted to be rotated by said motor, a manifold equipped with a plurality of nozzles suspended from said rotatable members and adapted to be raised and lowered by rotation thereof, a tank connected to said manifold and adapted to supply liquid fertilizer thereto, and means for alternately subjecting said manifold to pressure greater and less than atmospheric.

4. A fertilizing machine comprising a wheeled frame, a motor adapted to drive said frame, rotatable members carried by said frame and adapted to be rotated by said motor, a manifold equipped with a plurality of nozzles suspended from said rotatable members and adapted to be raised and lowered by rotation thereof, a tank connected to said manifold and adapted to supply liquid fertilizer thereto, means for alternately subjecting said manifold to pressure greater and less than atmospheric, a crank rotatably supported remote from said rotatable members and connected thereto to rotate therewith, and a connecting rod on said crank having its end resiliently connected to said manifold.

5. A fertilizing machine comprising a wheeled frame, a motor adapted to propel said wheeled frame, rotatable members carried by said frame and adapted to be rotated by said motor, links pivotally suspended from said rotatable members, a manifold resiliently mounted upon the lower ends of said links, a plurality of outlet nozzles on said manifold, means for supplying liquid fertilizer to said manifold, a cam rotatable with said rotatable members, and pressure means actuated by said cam for alternately subjecting said manifold to pressure greater and less than atmospheric.

6. A fertilizing machine comprising a wheeled frame, a motor adapted to propel said wheeled frame, rotatable members carried by said frame and adapted to be rotated by said motor, links pivotally suspended from said rotatable members, a manifold resiliently mounted upon the lower ends of said links, a plurality of outlet nozzles on said manifold, means for supplying liquid fertilizer to said manifold, a cam rotatable with said rotatable members, pressure means actuated by said cam for alternately subjecting said manifold to pressure greater and less than atmospheric, a crank rotatably supported in said frame remote from said rotatable members and connected thereto to rotate therewith, and a connecting rod on said crank having its end resiliently connected to said manifold.

In testimony whereof I affix my signature.

GEORGE C. KARSHNER.